Aug. 15, 1933.  F. L. CARSON ET AL  1,922,277
GREASE GUN
Filed April 25, 1932   2 Sheets-Sheet 1
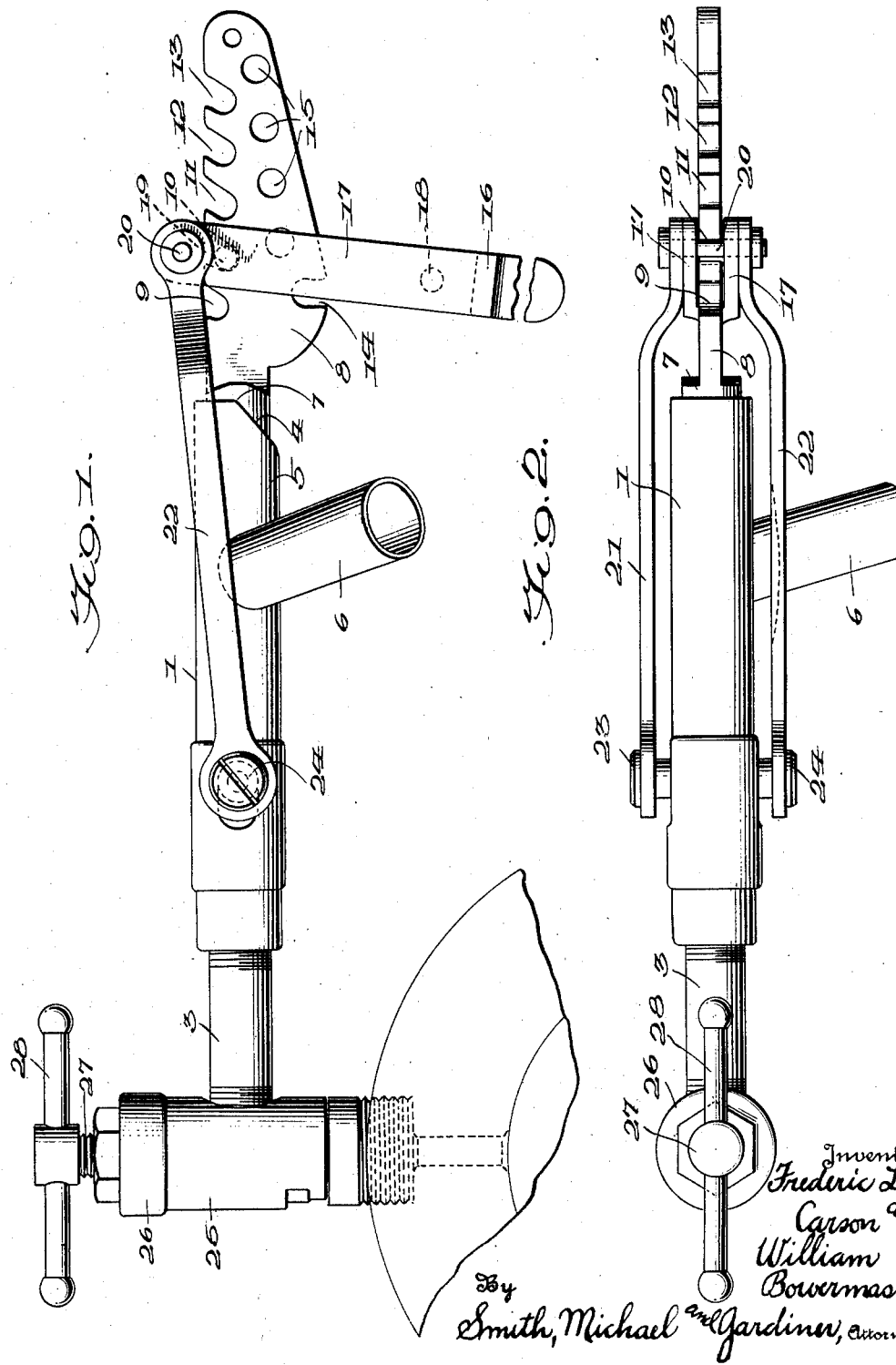

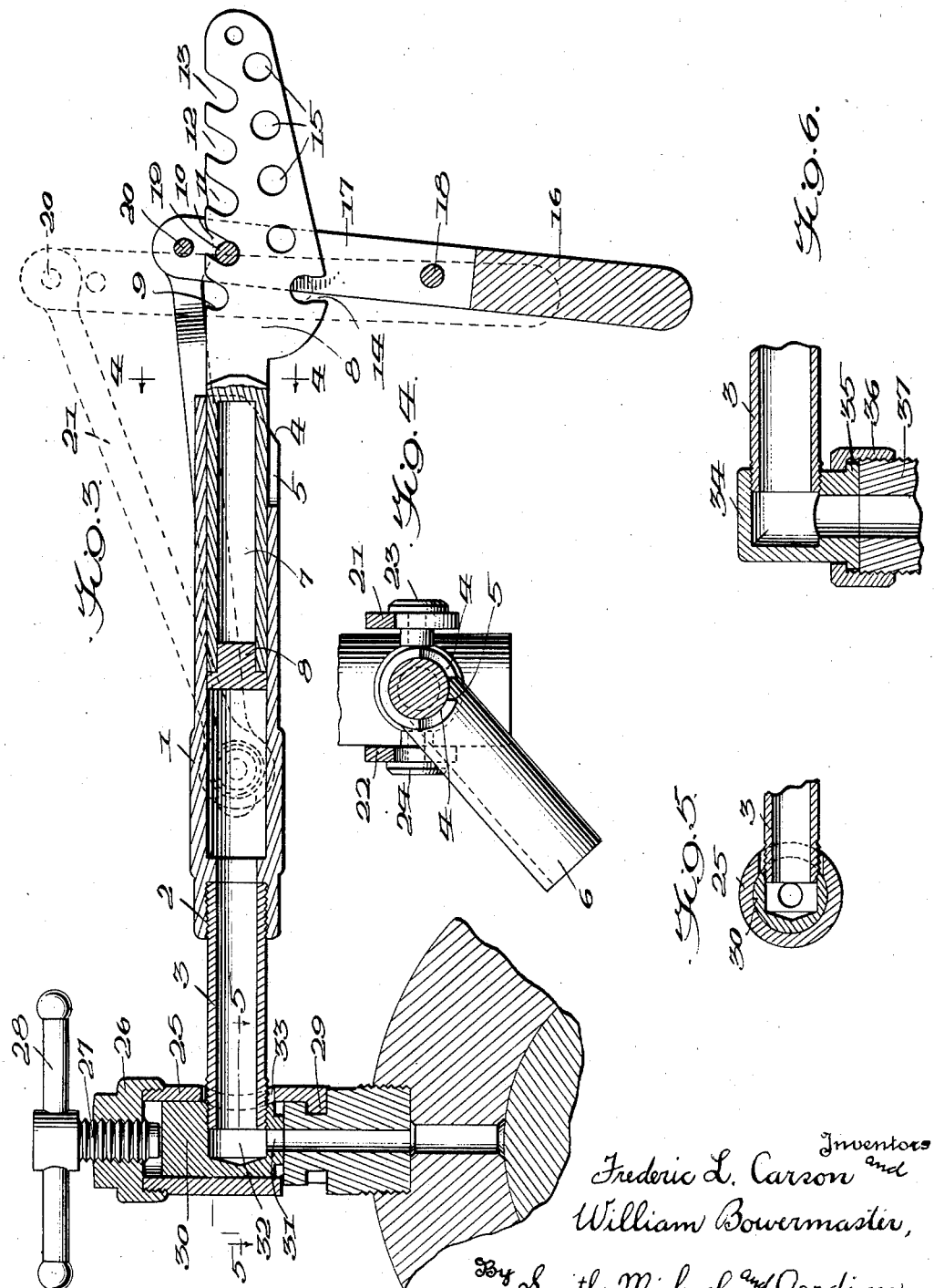

Patented Aug. 15, 1933

1,922,277

UNITED STATES PATENT OFFICE 1,922,277

GREASE GUN

Frederic Leon Carson and William Bowermaster, San Antonio, Tex.

Application April 25, 1932. Serial No. 607,432

10 Claims. (Cl. 221—47.4)

Our invention relates to grease guns, and has particular reference to an improved manually operated grease gun for forcing grease or other lubricant into and through the rod cups or other lubricating fittings of bearings which it is desired to lubricate.

It is an object of our invention to provide a light, relatively strong cylinder-and-piston type of force feed lubricator which can be readily attached to the lubricating fitting of the bearing, and by means of which the grease or other lubricant can be forced at high pressure to the bearing which it is desired to lubricate. While primarily intended for use in connection with the piston and connecting rod bearings of locomotives, the invention is not limited to this specific use, and the improved grease gun is capable of use for general lubricating purposes.

It is an object of our invention to provide a force feed lubricator of the cylinder-and-piston type and to provide a novel form of connector by means of which the device may be rigidly connected to the conventional flanged rod cups or fittings of the bearing, whereby the grease or other lubricant may be forced from the cylinder, through the connector and into the bearing, the connector including means for readily effecting a tight, leak-proof joint between the grease gun and fitting. In the preferred embodiment of our invention, we have developed a novel form of connector for effecting a tight, leak-proof joint between the grease gun and a flanged type of rod cup fitting, but the construction of the grease gun is such that this specific type of connector may be readily removed from the gun and replaced by other types of connectors, to cooperate with the particular type of fitting with which the bearing is equipped.

It is a further object of our invention to provide a grease gun of the cylinder-and-piston type in which the external portion or rod end of the piston is provided with a series of notches adapted to be selectively engaged by a pivoted operating lever or handle to move the piston progressively into the cylinder to forcibly expel the contained lubricant through the connector and into the bearing to be lubricated, the extended portion of the said piston also being provided with an additional notch with which the operating lever or handle may be engaged to withdraw the said piston from the cylinder after the cylinder has been emptied and additional grease or lubricant is to be supplied to the cylinder for subsequent lubricating purposes.

It is a still further object of our invention to provide a relatively light, portable, manually-operated grease gun, which is simple in construction, cheap and easy to manufacture and assemble, strong and durable, and highly efficient in the purposes for which designed.

In the accompanying drawings wherein, for the purpose of illustration, we have shown a preferred embodiment of our invention, Figure 1 is a side elevation of the improved grease gun showing the same attached to a conventional flanged type of rod cup or fitting on a bearing to be lubricated, Fig. 2 is a plan view of the grease gun, Fig. 3 is a vertical sectional view of the grease gun shown in Fig. 1, Fig. 4 is a transverse sectional view on the line 4—4 of Fig. 1, Fig. 5 is a transverse sectional view on the line 5—5 of Fig. 1, and Fig. 6 is a fragmentary sectional view showing a modified form of connector adapted for use with a threaded type of rod cup or lubricating fitting.

Referring to the drawings wherein like reference characters have been employed to designate similar parts throughout the several views, the numeral 1 designates a relatively elongated cylinder, the forward end of which is internally threaded as at 2 to receive a short section of pipe or tubing 3, both ends of which are externally threaded. The rear end of the cylinder 1 is undercut as at 4 and is provided with an axially-extending notch or slot 5 for a purpose to be hereinafter described. A filling pipe or tube 6 communicates with the interior of the cylinder near the rear end thereof, and grease or other lubricant is fed through this pipe or tube into the bore of the cylinder.

For the purpose of expelling the lubricant from the cylinder 1, we provide a piston 7 of novel form and construction, this piston being reciprocably mounted within the cylinder 1 and having means whereby the same may be moved to fill the cylinder and to thereafter forcibly expel the contained lubricant to the bearing which it is desired to lubricate. The forward end of the piston is closed by a plug 7a and suitable packing rings, not shown, may be provided to insure a tight sliding fit between the cylinder and piston. The rear or external end of the piston 7 is flattened as at 8 and the upper edge of this flattened portion is provided with a series of notches 9, 10, 11, 12 and 13, the side walls defining these notches being rearwardly inclined as clearly shown in Figs. 1 and 3 of the accompanying drawings. The lower edge of the flattened portion 8 is provided with a notch 14, and, if desired, the body of the flattened portion 8 may be provided with a plurality of holes 15 to decrease the weight of the piston, and, hence, the overall weight of the assembled grease gun.

To effect the inward and outward movements of the piston 7, we provide an operating lever or handle 16 comprising an upper bifurcated portion 17 between the legs of which the flattened portion 8 of the piston 7 is disposed. A lower transverse pin 18 and an upper transverse pin 19 extend between the legs of the bifurcated portion 17, the pin 19 being adapted to engage within the notches 9 to 13 inclusive to move the piston 7 inwardly, and the pin 18 being adapted to engage within the notch 14 to move the piston rearwardly of the cylinder when the entire contents of the cylinder has been expelled and it is desired to charge or refill the grease gun, it being noted that when the piston 7 has reached the limit of its inward movement, the forward edge of the flattened portion 8 of said piston reposes in the slot or notch 5 of the rear end of the cylinder. The spaced parallel arms of the upper bifurcated end 17 of the operating lever or handle 16 are apertured to receive a pivot pin 20 to which is pivotally connected a pair of links 21 and 22, the forward ends of which are pivotally connected to the outer surface of the cylinder 1 by pivot pins 23 and 24, respectively.

The preferred form of connector for operatively associating the grease gun to a flanged rod cup or similar flanged lubricating fitting, is shown in detail in Figs. 1 and 3 of the accompanying drawings, this connector comprising a hollow body portion 25 closed at its upper end by a centrally-apertured cap 26, the central aperture being threaded to receive a screw 27, which may be rotated by means of a transversely-extending rod or bar 28. The lower or bottom end of the body portion 25 is provided with an inturned flange 29, and this flange, as well as the end of the body portion, is cut away to provide a radial opening so that the body portion may be moved transversely over a flanged rod cup or similar fitting, with the flange 29 engaged beneath the flange of the rod cup or fitting to thus secure the body portion and its associated parts against axial movement with respect to said rod cup or fitting. A plug 30 is slidably mounted within the body portion 25 and is provided with an end opening 31 communicating with a chamber 32 within the plug, this chamber extending radially of the plug and having its walls threaded to receive the forward end of the pipe section 3, it being noted that the body portion 25 is provided with an opening 33 through which the pipe section 3 may extend.

In Fig. 6 of the accompanying drawings, we have shown a modified form of connector comprising an elbow pipe section 34 which may be screwed on to the forward end of the pipe section 3, the free end of this elbow section having an external flange 35 by means of which a cooperating, internally-threaded sleeve 36 is retained on the elbow member. This form of connector is adapted for use with the grease gun in connection with a lubricating fitting of the threaded type indicated by the reference character 37 in Fig. 6 of the accompanying drawings.

Referring now to the operation of the grease gun above described, it is to be noted that the same may be used with lubricant of any kind, but is preferably adapted for use with plastic or semi-plastic lubricant in stick or rod form, usually of a consistency approximating that of ordinary laundry soap. Assuming that the cylinder 1, pipe section 3, chamber 32 and passage 31 have been completely filled with lubricant and that it is desired to lubricate a journal or bearing equipped with a conventional flanged type of rod cup fitting, it is only necessary to move the connector body 25 transversely over the flanged fitting until the flange 29 engages beneath the flange of the fitting. The screw 27 is then rotated by the bar or handle 28, the bottom end of said screw forcing the plug member 30 into firm contact with the upper surface of the fitting and drawing the flange 29 tightly against the flange of the fitting, in which position the bore or passage 31 is in axial alinement with the bore or passage through the fitting. The operator then moves the handle 16 to engage the transverse pin 19 with the innermost notch 9 and by moving the handle 16 in a clockwise direction about the pivot pin 20, the piston 7 is moved inwardly of the cylinder 1 to force a portion of the grease from the cylinder through the pipe section 3 and passage 31 into and through the rod cup or fitting and to the bearing surface to be lubricated. Ordinarily, this one movement of the handle 16 is sufficient to expel the necessary amount of lubricant to properly lubricate the bearing, but if additional lubricant is required for this particular bearing, the operator lifts the handle to disengage the transverse pin 19 from the notch 9 and engages said pin with the notch 10, whereupon a clockwise movement of the handle will move the piston 7 inwardly to force additional lubricant to the bearing. Assuming that these operations are sufficient to properly lubricate the particular bearing and that it is desired to disconnect the device from the rod cup, the screw 27 is rotated by the handle 28 to move the lower or inner end of said screw out of contact with the top of the plug 30. The entire device is then moved transversely of the fitting to disengage the flange 29 from beneath the flange of the fitting, and thus the operation of lubricating this particular bearing has been completed. The gun is then applied to the next rod cup or fitting and clamped securely thereon in the manner and by the mechanism above described, and when so connected, the handle 16 is moved to disengage the transverse pin 19 from the notch 10 and to engage the pin 19 with the notch 11. Clockwise movement of the handle 16 moves the piston 7 inwardly of the cylinder 1 to force a portion of the grease from the cylinder and to the bearing. Additional lubricant can be expelled either to the same or other bearings by progressively engaging the pin 19 with the notches 12 and 13.

As soon as the piston 7 has reached the limit of its inward movement, i. e., when the pin 19 has engaged the notch 13 and the forward edge of the flattened portion 8 contacts with the end of the slot 5, it is necessary to charge or refill the cylinder before further lubrication can be effected. When such refilling becomes necessary, the operator lifts the handle 16 to disengage the pin 19 from the outermost notch 13 and to engage the transverse pin 18 within the notch 14. With the pin 18 engaged within the notch 14, the operator moves the handle in a counterclockwise direction to withdraw the piston 7 toward the outer or open end of the cylinder, thus establishing communication between the filling tube 6 and the interior of the cylinder 1. The lubricant, preferably in stick or rod form, is introduced through the tube 6 until the inner end of the stick or rod occupies a position within the cylinder 1, whereupon the handle 16, with the pin 18 still engaged within the notch 14, is moved in a clockwise direction, which moves the piston 7 inwardly, cuts off the end of the stick or rod lubricant, and firmly packs the cut-off portion within the cylinder ahead of the piston. When this one operation does not completely fill the cylinder, the handle 16, with the pin 18 still engaged within the notch 14, is again moved in a counterclockwise direction about the pivot pin 20 to again withdraw the piston 7 toward the outer or open end of the cylinder, whereupon additional lubricant can be introduced into the cylinder, and the handle again moved in a clockwise direction to move the piston 7 inwardly, cut off the end of the stick or rod lubricant, and firmly pack the cut-off portion within the cylinder ahead of the piston. It is to be understood, of course, that when the device is new and there is no lubricant within the passages of the connector, pipe section 3 or cylinder 1, it is necessary to oscillate the handle 16 several times with the pin 18 engaged within the notch 14, to cut off sufficient lubricant to pack or completely fill the passage of the connector, pipe section 3 and cylinder 1 ahead of the piston 7. After the charging or refilling has been accomplished, the handle 16 is moved to disengage the pin 18 from the notch 14 and to engage the pin 19 with the innermost notch 9, in which position the gun is ready for use. Attention is particularly invited to the fact that the walls defining the notches 9, 10, 11, 12 and 13 are rearwardly inclined so that considerable pressure can be exerted on the handle 16 without fear of the pin 19 slipping out of the notches during the lubricating operation. Further, the walls defining the notch 14 are relatively straight so that the pin 18 can reciprocate the piston in either direction during the charging or filling operation, without slipping out of the said notch.

When it is desired to utilize the grease gun in connection with a lubricating fitting of the threaded type, such as shown at 37 in Fig. 6 of the accompanying drawings, the preferred form of connector above described is unscrewed from the pipe section 3 and a connector of the type shown in Fig. 6, is screwed on to said pipe section. When this type of connector is employed, the sleeve 36 is screwed on to the fitting 37 to force the face of the connector into firm contact with the face of the fitting, to thus establish a tight, leak-proof joint or connection. Obviously, other types of connectors may be screwed on to the end of the pipe section 3, the type of connector selected being determined by the type of fitting with which any particular bearing is equipped. The provision of the pipe section 3 is an important feature of our invention, as we have found that repeated association of different types of connectors with the gun, eventually wears down or ruins the threads on the end of said pipe section. If the threads were formed on the body of the cylinder 1 and became worn down or otherwise ruined, the entire gun would be rendered useless, but with our construction, the pipe sections 3 can be readily replaced at a very nominal cost as compared with the cost of the cylinder 1.

It is to be understood that the form of our invention herein shown and described, is to be taken as a preferred embodiment of the same, and that numerous changes may be made in the size, shape and arrangement of parts without departing from the spirit of our invention or the scope of the subjoined claims.

Having thus described our invention, we claim:

1. A grease gun comprising a cylinder, means for supplying lubricant to said cylinder, a piston mounted within said cylinder, a lever for operating said piston, means on the piston for engagement by said lever for forcing said piston into said cylinder to expel the lubricant therefrom, means on said piston independent of said last mentioned means for engagement by said lever for moving the piston to permit refilling of said cylinder with lubricant, and means for connecting said cylinder to a fitting on the bearing to be lubricated.

2. A grease gun comprising a cylinder, means for supplying lubricant to said cylinder, a piston mounted within said cylinder, a lever pivotally connected to said cylinder for operating said piston, means on the piston for engagement by said pivoted lever for forcing said piston into said cylinder to expel the lubricant therefrom, means on said piston independent of said last mentioned means for engagement by said pivoted lever for moving the piston to permit refilling of said cylinder with lubricant, and means for connecting said cylinder to a fitting on the bearing to be lubricated.

3. A grease gun comprising a cylinder, means for supplying lubricant to said cylinder, a piston mounted within said cylinder, a lever pivotally mounted on the cylinder for operating said piston, said piston having a series of notches along one edge for engagement by said lever to progressively move said piston into the cylinder to expel lubricant therefrom and having a notch in one edge for engagement by said lever for moving the piston to permit refilling of said cylinder with lubricant, and means for connecting said cylinder to a fitting on the bearing to be lubricated.

4. A grease gun comprising a cylinder, means for supplying lubricant to said cylinder, a piston mounted within said cylinder and having a flattened portion exterior of the cylinder, a lever pivotally connected to said cylinder for operating said piston, the flattened portion of said piston having a series of notches along one edge for engagement by said pivoted lever to move said piston into the cylinder to expel lubricant therefrom, means on said piston for engagement by said pivoted lever for moving the piston to permit refilling of said cylinder with lubricant, and means for connecting said cylinder to a fitting on the bearing to be lubricated.

5. A grease gun comprising a cylinder, means for supplying lubricant to said cylinder, a piston mounted within said cylinder and having a flattened portion exterior of the cylinder, a lever for operating said piston, means on the said piston for engagement by said lever to move said piston into the cylinder to expel lubricant therefrom, said flattened portion having a notch for engagement by said lever for moving the piston to permit refilling of said cylinder with lubricant, and means for connecting said cylinder to a fitting on the bearing to be lubricated.

6. A grease gun comprising a cylinder, means for supplying lubricant to said cylinder, a piston mounted within said cylinder and having a flattened portion exterior of the cylinder, a lever pivotally connected to said cylinder for operating said piston, the flattened portion of said piston having a series of notches along its upper edge for engagement by said lever for progressively moving the piston into the cylinder to expel lubricant therefrom and having a notch in its bottom edge for engagement by said lever for moving the piston to permit refilling of said cylinder with lubricant, and means for connecting said cylinder to a fitting on the bearing to be lubricated.

7. A grease gun comprising a cylinder, means for supplying lubricant to said cylinder, a piston mounted within said cylinder, a pair of links pivotally connected to said cylinder at opposite sides thereof, a bifurcated lever pivotally connected to said links with the arms of said lever disposed on opposite sides of said piston, means on said lever to selectively engage the piston to either force lubricant from the cylinder or to move the piston to permit refilling of said cylinder with lubricant, and means for connecting said cylinder to a fitting on the bearing to be lubricated.

8. A grease gun comprising a cylinder, means for supplying lubricant to said cylinder, a piston mounted within said cylinder and having a flattened portion exterior of the cylinder, a pair of links pivotally connected to said cylinder at opposite sides thereof and extending on opposite sides of the flattened portion of said piston, a bifurcated lever pivotally connected to said links with the arms of said lever disposed on opposite sides of said piston, the flattened portion of said piston having means along one edge for engagement by the lever to move the piston into the cylinder to expel lubricant therefrom and also having means for engagement by said lever to move the piston to permit refilling of said cylinder with lubricant, and means for connecting said cylinder to a fitting on the bearing to be lubricated.

9. A grease gun comprising a cylinder, means for supplying lubricant to said cylinder, a piston mounted within said cylinder and having a flattened portion exterior of the cylinder, said flattened portion having a notch in its upper edge and a notch in its lower edge, bifurcated lever having its arms disposed on opposite sides of said piston, means on said bifurcated lever for engagement with the notch in the upper edge of the flattened portion of the piston to move said piston into the cylinder to expel lubricant therefrom, means on said bifurcated lever for engagement with the notch in the lower edge of the flattened portion to move said piston to permit refilling of said cylinder with lubricant, and means for connecting said cylinder to a fitting on the bearing to be lubricated.

10. A grease gun comprising a cylinder, means for supplying lubricant to said cylinder, a piston mounted within said cylinder and having a flattened portion exterior of the cylinder, said flattened portion having a series of notches along its upper edge and a notch in its lower edge, a pair of links pivotally connected to said cylinder at opposite sides thereof and extending on opposite sides of the flattened portion of said piston, a bifurcated lever pivotally connected to said links above the flattened portion of said piston with the arms of the lever disposed on opposite sides of the flattened portion, a transverse pin extending between the arms of the lever above the flattened portion of the piston for engagement with any one of the series of notches along the upper edge of the flattened portion to move the piston inwardly to expel lubricant from the cylinder, a transverse pin extending between the arms of the lever below the flattened portion of said piston for engagement with the notch in the lower edge of the flattened portion to move the piston to permit refilling of said cylinder with lubricant, and means for connecting said cylinder to a fitting on the bearing to be lubricated.

FREDERIC LEON CARSON.
WILLIAM BOWERMASTER.